(No Model.)

R. CHADWICK & G. S. BOUTWELL.
MACHINE FOR MAKING HOLLOW METALLIC KNIFE HANDLES.

No. 378,287. Patented Feb. 21, 1888.

WITNESSES:
Chas. H. Luther Jr
Willis Fowler

INVENTORS:
Richard Chadwick
George S. Boutwell
By Joseph A. Miller &co.
Attys

UNITED STATES PATENT OFFICE.

RICHARD CHADWICK AND GEORGE S. BOUTWELL, OF PROVIDENCE, RHODE ISLAND.

MACHINE FOR MAKING HOLLOW METALLIC KNIFE-HANDLES.

SPECIFICATION forming part of Letters Patent No. 378,287, dated February 21, 1888.

Application filed January 22, 1887. Serial No. 225,140. (No model.)

*To all whom it may concern:*

Be it known that we, RICHARD CHADWICK and GEORGE S. BOUTWELL, both of the city and county of Providence, and State of Rhode Island, have invented certain new and useful Improvements in Apparatus for Making Metallic Knife-Handles, of which the following is a full, clear, and exact description, reference being had to the accompanying drawings, forming part of this specification.

This invention relates to apparatus for making metallic knife-handles or hafts out of tubular blanks.

Among the methods heretofore in use for making hollow metallic handles, there is one method which consists in punching or drawing up an open metallic tube into a peculiar shape and then closing the butt-end thereof by a soldered cap, so as to form the finished closed tubular handle. The handle so produced is an inferior article, because the soldered seams do not stand the wear, and such handles are at the best comparatively short-lived.

The object of our invention is to provide apparatus for making metallic handles.

To the above purpose our invention consists in the certain mechanical devices, as set forth in the claims at the end of this specification, comprising the following features, namely: pivoted formers of varying cross-section; interchangeable graduated expanders for expanding the formers; means for supporting and operating the expander, and a swinging bed for the work to rest against.

In order that our invention may be fully understood, we have illustrated in the accompanying drawings and will proceed to describe the best manner so far devised by us of carrying out our improvements, which admit of various modifications.

Figure 1:
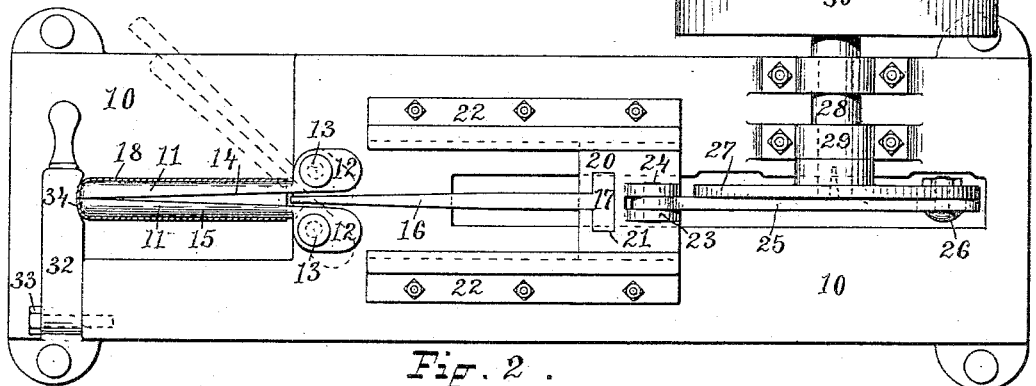
Figure 2:
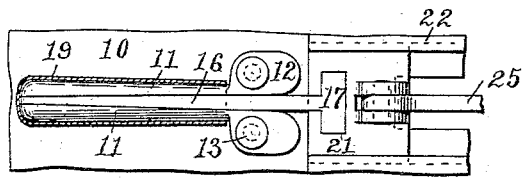
Figure 6:
Figure 3:
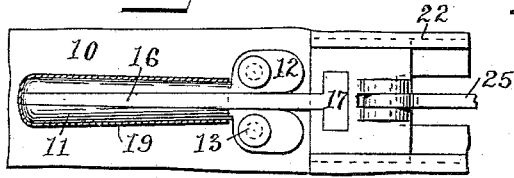
Figure 7:
Figure 4:
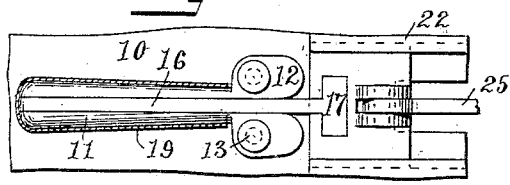
Figure 5:
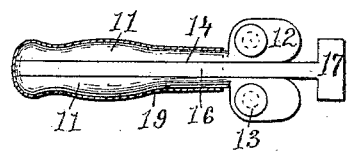

In the accompanying drawings, Figure 1 represents a top plan view of our improved machine for making the closed tubular metal handles of variable cross-sections, and shows the closed cylindrical tubular blank placed upon the pair of formers, which may be swung aside into the dotted-line position to receive the blank. In this view the first of a set of graduated expanders is shown as about to enter between the formers. Figs. 2, 3, and 4 show, respectively, top plan views of similar portions of the machine shown in Fig. 1, and the three said figures represent in succession the first, second, and third increasing sizes of the expanders, which are forced between the pivoted formers in the order of their increasing sizes, in order to spread apart the formers and to expand the said tubular blank into the requisite size and shape. Fig. 5 represents a top plan view of a pair of pivoted formers having contours different from those shown in the other views, and shows also the largest-sized expander interposed between the formers upon which a finished closed tubular handle is mounted. Fig. 6 represents a broadside view of a finished handle, of which the figure also shows a cross-section. Fig. 7 represents a broadside view of a finished handle made on the formers having the swelled or wavy sides.

In the said drawings like numbers of reference designate corresponding parts throughout.

Referring to the drawings, the number 10 represents the machine-frame. The formers 11 are provided with perforated flat heads 12, through the perforations of which pass the pivots 13, which are secured to the machine-frame in order to allow the formers to swing freely in the same plane on the pivotal axes and to hold the former securely against the longitudinal action of the expanders, as hereinafter described. The heads of the formers are slightly rounded, and the formers are spaced from each other sufficiently to admit the greatest thickness of the expanders. The formers are constructed precisely alike, and their shanks are formed of a variable cross-section, the inner face, 14, of the former being flat, while the outer face, 15, is rounded. The butt or free end of the shank is partly rounded and is the largest part, the shank decreasing in cross-section to its juncture with the head 12. A pair of the members, 11, together comprise an expansible former.

In order to expand the formers after they have been brought near together, we employ a set of graduated expanders, 16, which are provided with a stock or enlargement, 17, and which are of the same width as the formers, but of a tapering thickness or wedge-shaped, and increase in size until the last of the series (shown in Figs. 4 and 5) is of a uniform thickness. The outer ends of the expanders are rounded, so that when the expanders are interposed singly between the formers, with their free ends flush with the free ends of the formers the outer faces of all the bodies are flush. The shape of the three assembled bodies—namely, a pair of formers and an expander—is that of a flattened tapering form having a variable elliptical cross-section. As the size of the expanders increases, the shape approaches nearer the desired shape of the finished handle, until the last of the set of expanders is reached, when this shape is exactly that of the finished handle, only slightly smaller.

It will now be obvious that if a cylindrical tube, as 18 in Fig. 1, having a closed end and formed seamless, be placed over the pair of formers the inner faces, 14, of the formers will touch only at their outer ends and there will be a wedge-shaped interspace. Now, if a wedge-shaped expander, as 16 in Fig. 1, be forced in between the formers into the position shown in Fig. 2, the formers will be expanded or driven apart, and this action will necessarily stretch or expand the previously cylindrical blank 18 in Fig. 1 into the incomplete handle 19, which has now been expanded into a flattened taper form having a variable oval cross-section. After withdrawing the first expander 16, (shown in Figs. 1 and 2,) and without disturbing the formers or incomplete handle, we next force the second-sized expander 16, as shown in Fig. 3, in between the formers and expand the handle farther, and again we repeat this same method by entering the largest and last expander between the formers to complete the handle 19, as shown in Fig. 4, and which may be then removed from the formers by withdrawing the expander and allowing the formers to come together.

By virtue of forming the outer faces, 15, of the formers irregular or swelled in wavy outlines, as shown in Fig. 5, we are enabled to make a closed metallic tubular handle of a peculiar form by the above-described method. By this method we produce from a cylindrical metallic tube closed at one end and seamless a closed tubular seamless handle having a variable oval cross-section and formed either with the wavy outlines or without. Of course to shape the formers like longitudinal halves of a cone would be within the scope of our invention. This method of stretching or expanding closed metallic tubes by means of the graduated expanders is productive of good results, in that the walls of the tube at the enlarged or expanded end are stretched uniformly, and hence are of uniform thickness and free from thin places in the metal, which would arise from undue stretching in certain spots.

We are aware that tubes have been changed in form by pressure exerted internally by a die or plunger and resisted by an external die or matrix, by which portions of the metal of the tubular blank are driven into recesses in the external die or matrix by means of the internal expansible tool or die; therefore we do not claim such a method or process, as it differs in every essential from our improved process, in which the tensile strength of the metal in the tubular blank is the sole resistance, and in which the internal die or expansible former is the sole means for determining the form the blank is to assume. Our method involves the principle of making the finished form of the knife-handle solely dependent upon the shape or contour of the means by which the tubular blank is stretched from within into the finished handle.

To facilitate the necessary insertion and withdrawal *seriatim* of the requisite set of graduated expanders, we have devised mechanism whereby the expanders can be readily reciprocated lengthwise. The mechanism consists in an expander-carriage, 20, formed with a countersunk conformation, 21, to receive the removable expanders 16, and which slides in the ways 22, fixed upon the machine-frame 10. Upon the expander-carriage are cast the ears 23, between which extends a pin, 24, upon which the inner end of the pitman 25 turns. This pitman 25 is operated by means of the wrist-pin 26, to which it is connected and which is secured to the crank-wheel 27, keyed upon the drive-shaft 28, which is journaled in the uprights 29 on the machine-frame. The ordinary fast and loose pulleys, 30 31, are also mounted on the drive-shaft. The turning of the drive-shaft 28 will in an obvious way serve to reciprocate the expander-carriage and the expander carried thereby; and since the carriage is adjusted to force the expander directly between the separable formers, as clearly indicated in the drawings, the expander will be forced between the formers and withdrawn as desired. The driving-belt has not been shown, but an automatic belt-shipper may be employed to ship the driving-belt from the fast to the loose pulley when an expander is to be replaced or a blank to be introduced, or the completed handle is to be withdrawn, and then to ship it back again to drive the machine.

Though the formers may be expanded without the use of a bed for the blank or handle to impinge upon when being stretched by the expanders, we have constructed a swinging bed, 32, for such a purpose. This bed is mounted on the pivot 33, fixed to the machine-frame, and is furnished with a handle for the operator to grasp when swinging the bed into or out of operative position. The inner face of the bed is arranged with a curved depression, 34, to receive the butt-end of the metallic handle.

From the foregoing description the following operation of the machine will be readily understood: The cylindrical closed tubular blank 18 is placed on the formers 11, which are previously swung out into the broken-line position in order to allow the blank to slip easily on, and the bed 32 is swung back into the position shown, and then the machine starts and inserts and withdraws the first expander which has been mounted in the carriage. Then this expander is replaced by a larger one, whereupon the above movements are repeated, and so on, using the set of graduated expanders *seriatim* to complete the handle.

Having thus described our invention, we claim as new and desire to secure by Letters Patent—

1. The combination, as hereinbefore set forth, with a machine-frame and the formers, each shaped like a part or section of the form to be produced, of an expander for expanding the formers, and means for supporting and actuating the expander, substantially as herein described.

2. The combination, as hereinbefore set forth, with a machine-frame and a pair of pivoted formers, of interchangeable graduated expanders for expanding the formers, and means for supporting and actuating the expanders, substantially as herein described.

3. The combination, as hereinbefore set forth, with a machine-frame, of a pair of formers having variable cross-sections and pivoted in the same plane and lying apart, a detachable expander and a reciprocating expander-carriage therefor, and means for actuating the expander-carriage, substantially as herein described.

4. The combination, as hereinbefore set forth, with a machine-frame and pivoted formers, each having a variable cross-section, of a detachable expander and a reciprocating expander-carriage therefor, a drive-shaft and a crank-wheel provided with a wrist-pin, and a pitman intermediate of the wrist-pin and expander-carriage, substantially as herein described, whereby the revolution of the drive-shaft may force the expander between the formers and withdraw it, for the purpose set forth.

5. The combination, as hereinbefore set forth, with the machine-frame and pivoted formers, and the expander for entering among the formers, of a swinging bed co-operating with said formers and expander, substantially as herein described.

6. The combination, as hereinbefore set forth, with the separable formers 11, each shaped like a portion or section of the form to be produced, of the expander 16 for entering among and expanding the formers, substantially as and for the purpose herein described.

RICHARD CHADWICK.
GEORGE S. BOUTWELL.

Witnesses:
M. F. BLIGH,
J. A. MILLER, Jr.